US009139154B2

United States Patent
Abramoski et al.

(10) Patent No.: US 9,139,154 B2
(45) Date of Patent: Sep. 22, 2015

(54) SIDE CURTAIN AIRBAG FOR VEHICLE HAVING INFLATABLE EXTENSION

(71) Applicant: Ford Global Technologies, LLC, Dearborn, MI (US)

(72) Inventors: Edward Joseph Abramoski, Canton, MI (US); Sean Timothy Ryan, Farmington Hills, MI (US); Pardeep Kumar Jindal, Canton, MI (US); Rahul Makwana, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/076,539

(22) Filed: Nov. 11, 2013

(65) Prior Publication Data

US 2015/0130171 A1 May 14, 2015

(51) Int. Cl.
*B60R 21/16* (2006.01)
*B60R 21/232* (2011.01)
*B60R 21/213* (2011.01)
*B60R 21/231* (2011.01)

(52) U.S. Cl.
CPC .............. *B60R 21/232* (2013.01); *B60R 21/213* (2013.01); *B60R 21/23138* (2013.01)

(58) Field of Classification Search
USPC ....................................................... 280/730.2
IPC ........................ B60R 21/232,21/23138, 21/213
See application file for complete search history.

(56) References Cited

U.S. PATENT DOCUMENTS

| | | | | |
|---|---|---|---|---|
| 6,155,594 A | * | 12/2000 | Ibe et al. | 280/728.2 |
| 7,618,057 B2 | * | 11/2009 | Pinsenschaum et al. | 280/730.2 |
| 7,823,922 B2 | * | 11/2010 | Mitchell et al. | 280/743.2 |
| 7,850,197 B2 | * | 12/2010 | Zucal et al. | 280/728.3 |
| 8,186,709 B2 | * | 5/2012 | She | 280/730.2 |
| 8,590,926 B2 | * | 11/2013 | Saimura et al. | 280/730.2 |
| 8,714,587 B2 | * | 5/2014 | Nakamura et al. | 280/730.2 |
| 8,720,941 B1 | * | 5/2014 | Svensson | 280/730.2 |
| 2006/0012156 A1 | * | 1/2006 | Boxey | 280/730.2 |
| 2006/0290122 A1 | * | 12/2006 | Woydick | 280/743.2 |
| 2008/0012275 A1 | | 1/2008 | Pinsenschaum et al. | |
| 2014/0312600 A1 | * | 10/2014 | Verner | 280/728.2 |

* cited by examiner

*Primary Examiner* — Faye M Fleming
(74) *Attorney, Agent, or Firm* — LeClairRyan

(57) ABSTRACT

A curtain airbag system for an automotive vehicle is disclosed. The system includes a curtain module substantially embedded in the roof rail in its normal, non-inflated state. The module includes an inflatable curtain attached to an inflator. The inflatable curtain has a forward portion. An elongated and inflatable extension is attached to the forward portion of the curtain. When the curtain is inflated in an impact event, the elongated and inflatable extension extends from the curtain and at least partially overlaps the A-pillar and at least part of the grab handle. The elongated and inflatable extension is a first extension that extends from the forward portion of said curtain. The inflatable curtain may include a second, triangular-shaped extension extendable from the forward portion of the curtain when the curtain is inflated.

13 Claims, 5 Drawing Sheets

SIDE CURTAIN AIRBAG FOR VEHICLE HAVING INFLATABLE EXTENSION

TECHNICAL FIELD

The disclosed inventive concept relates generally to side curtain airbags for vehicles. More particularly, the disclosed inventive concept relates to a side curtain for a vehicle having an elongated and inflatable extension that extends along the A-pillar towards the A-pillar mounted grab handle.

BACKGROUND OF THE INVENTION

Curtain airbag systems for automotive vehicles are commonly employed to reduce occupant injury during an impact event. Known curtain airbag systems, also sometimes called side impact or rollover curtain airbags, are directed to providing a cushioning layer between the interior of the vehicle and the occupant when the curtain inflates during the impact event.

Known curtain airbags generally deploy downwardly from the roof rail in an accident event. Today's curtain airbags inflate to a point at the bottom or below the A-pillar-mounted grab handle when provided. When the curtain inflates, it provides coverage below the A-pillar trim but normally does not cover either the A-pillar trim itself or the grab handle.

Given the area adjacent to the occupant that is protected by today's curtain airbags in an accident event, the occupant tends to travel towards the vehicle A-pillar due to the angular and lateral motion of the vehicle at impact. In some vehicles the occupant's head may contact the A-pillar and may slide forward along the pillar.

If a vehicle has a grab handle on the A-pillar, the head of the occupant may slide forward and contact the grab handle. At this point the forward motion of the occupant's head may be impeded relative to the body.

As in so many areas of vehicle technology there is always room for improvement related to the use and operation of curtain airbag systems for automotive vehicles.

SUMMARY OF THE INVENTION

The disclosed inventive concept provides an improvement to known curtain airbag systems by providing protection for the occupant from injury caused by a grab handle in an impact event. Particularly the disclosed inventive concept includes a curtain airbag system for a vehicle in which the vehicle has a passenger compartment and further includes a roof rail, A-pillar connected to the roof rail, and a grab handle attached to the A-pillar.

The disclosed inventive concept includes a curtain module substantially embedded in the roof rail in its normal, non-inflated state. The curtain module includes an inflatable curtain attached to an inflator. The inflatable curtain has an arcuate forward portion. A elongated and inflatable extension is attached to the forward portion of the curtain. When the curtain is inflated in an impact event, the elongated and inflatable extension inflates and extends from the curtain and at least partially overlaps at least the grab handle.

The elongated and inflatable extension is a first extension and extends from the forward portion of said curtain. The inflatable curtain further includes a second extension or sail that may extend from the forward portion of the curtain and substantially below the inflatable extension when the curtain is inflated. The second extension or sail has a triangular shape. A portion of the triangle also extends at least over the grab handle when the second extension is, extended.

In an impact event the inflatable curtain is inflated by the inflator. As it is fluidly connected to the inflatable curtain the elongated and inflatable extension is inflated simultaneously. Upon inflation, the elongated and inflatable extension extends in the direction of and possibly over at least a portion of the grab handle to protect the occupant's head from impacting the roof rail, the A-column, or its associated grab handle by way of lateral movement in the event of vehicle-forward or sideways movement by the occupant. Instead, the disclosed inventive concept reduces or substantially eliminates the possibility that the occupant's head will move laterally but instead directs the head to travel forward and slide along the elongated and inflatable extension.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
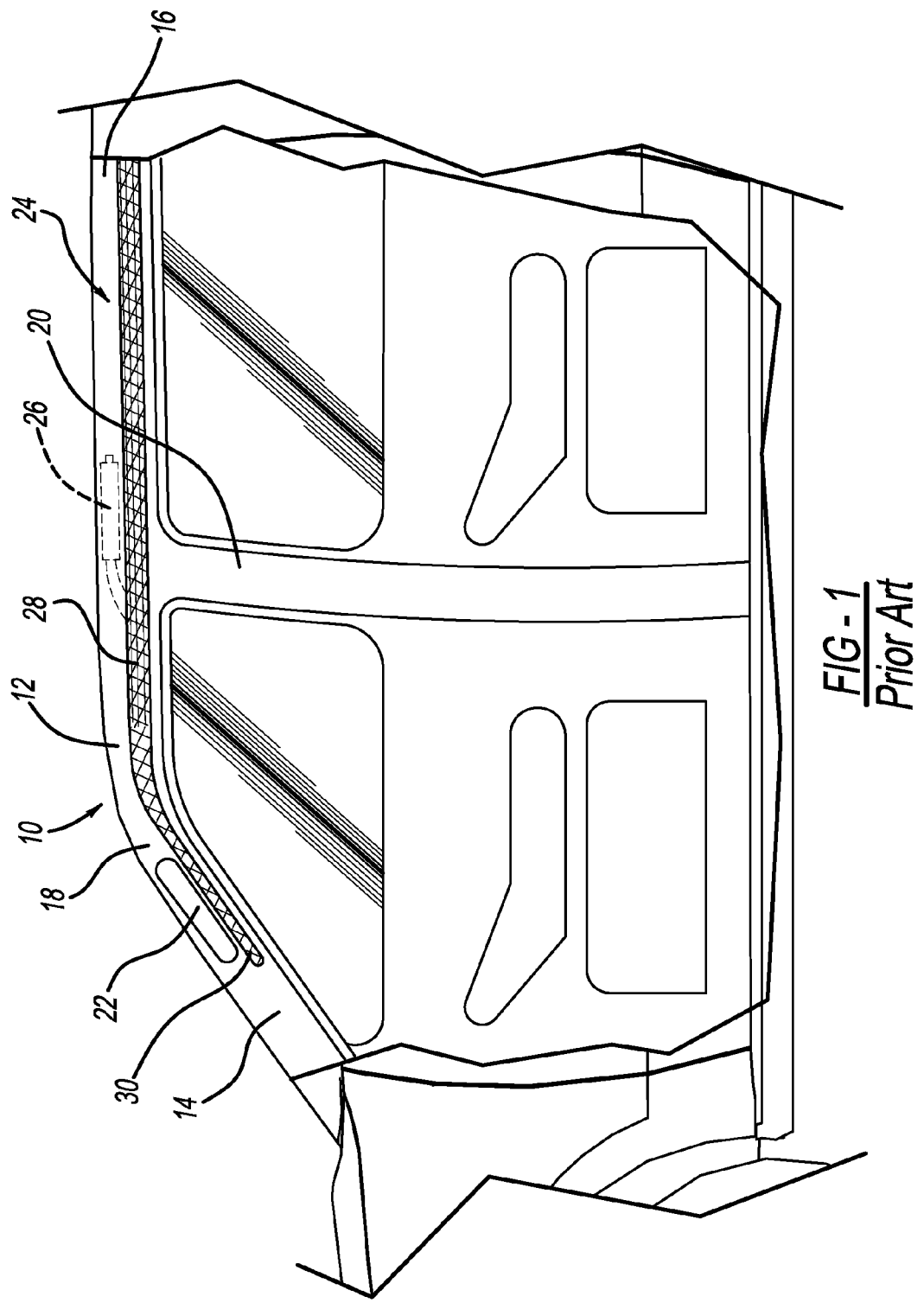
FIG. 1 illustrates the passenger side of the vehicle interior when viewed from the driver's side having a curtain airbag system prior to deployment according to the prior art prior.

In the following figures, the same reference numerals will be used to refer to the same components. In the following description, various operating parameters and components are described for different constructed embodiments. These specific parameters and components are included as examples and are not meant to be limiting.

In general, the disclosed invention provides a system and method for allowing the occupant of a vehicle to avoid engagement with either the grab handle or a pillar such as an A-pillar. The disclosed inventive embodiments provide advancements in the art of known curtain airbags according to the prior art illustrated in FIGS. 1 and 2.

Referring to the prior art curtain airbag shown in FIG. 1, an environmental view of the passenger side of a vehicle interior of a vehicle 10 is illustrated. The view of the passenger side shown in FIG. 1 is in an elevated view taken from the driver's side of the vehicle.

As is known in the art, the vehicle 10 includes a roof rail 12. The roof rail 12 includes a forward portion 14 and a rearward portion 16. An A-pillar 18 extends from the forward portion 14 while a B-pillar 20 extends from a point on the roof rail 12 intermediate the forward portion 14 and the rearward portion 16.

A grab handle 22 is fitted to the A-pillar 18 but it is to be understood that the placement on the A-pillar 18 may be other than that shown. Furthermore, the B-pillar 20 may be fitted with a grab handle as well.

A curtain module 24 is conventionally provided and is substantially embedded within the roof rail 12. As is known in the art, the curtain module 24 includes an inflator 26 and an inflatable curtain 28 made from a resilient flexible material such as reinforced nylon. The inflatable curtain 28 is shown rolled up as shown. A sail cloth 30 attached to the inflatable curtain 28 and is also rolled up within the A-pillar 20.

Figure 2:
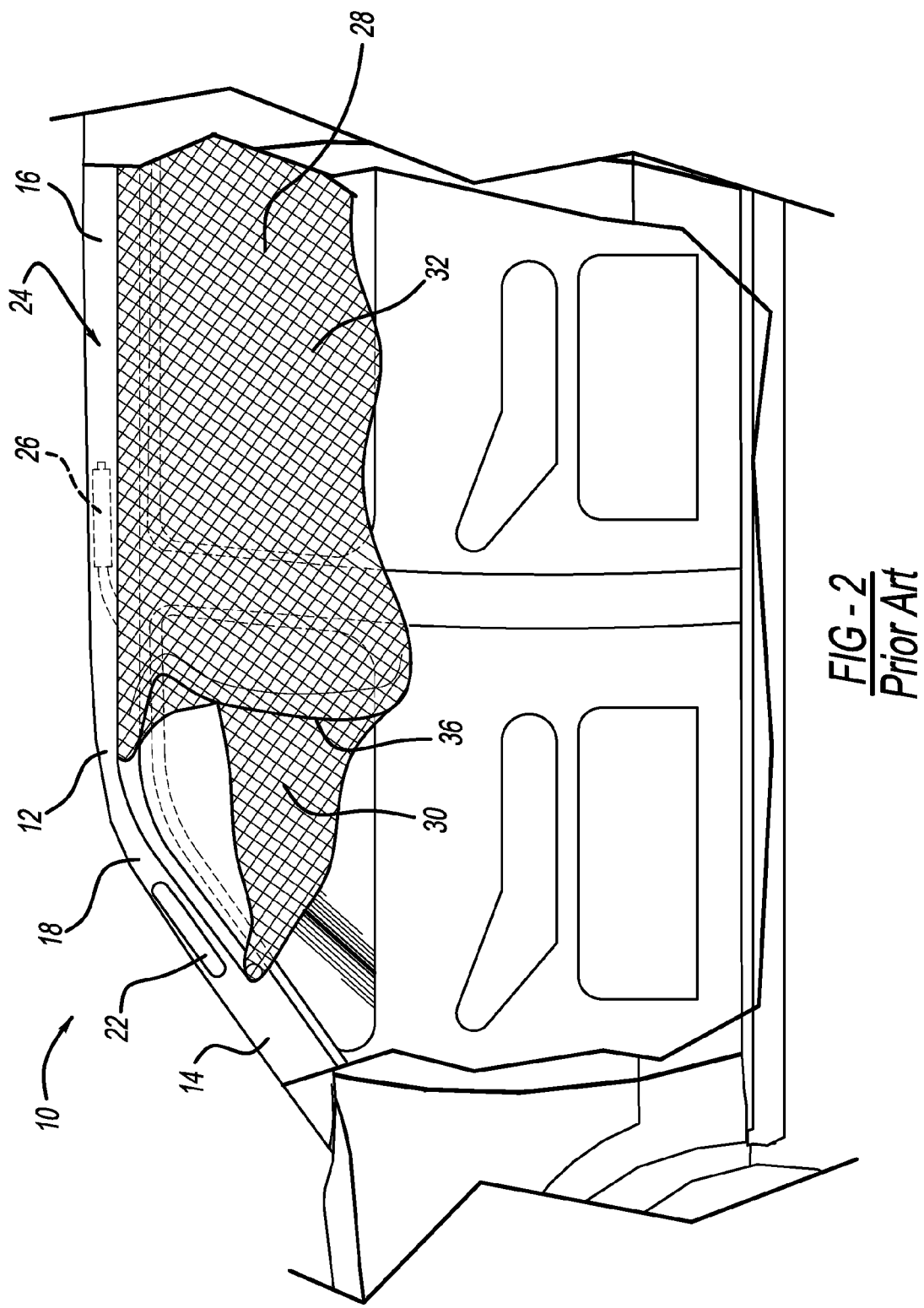
FIG. 2 illustrates the passenger side of the vehicle interior having a curtain airbag system of FIG. 1 following deployment according to the prior art.

Referring to FIG. 2, the inflatable curtain 28 includes a main body 32. The main body 32 includes a leading edge 36. Extending from the leading edge 36 of the main body 32 of the inflatable curtain 28 is the sail cloth 30.

In an impact event the inflator 26 is signaled by an impact sensing system (not shown) to cause the curtain filling gas to enter and fill the inflatable curtain 28. The sail cloth 30 either peels through the trim of the A-pillar or the cover of the A-pillar may be hingedly attached, thus allowing at least a portion of the cover to pivot out of the way, thus allowing deployment of the sail cloth 30 as illustrated in FIG. 2.

The inventive concept of the disclosed embodiment provides of elongated and inflatable extensions of different lengths that extend from an inflatable curtain. This concept is illustrated in FIGS. 3 through 6.

Figure 3:
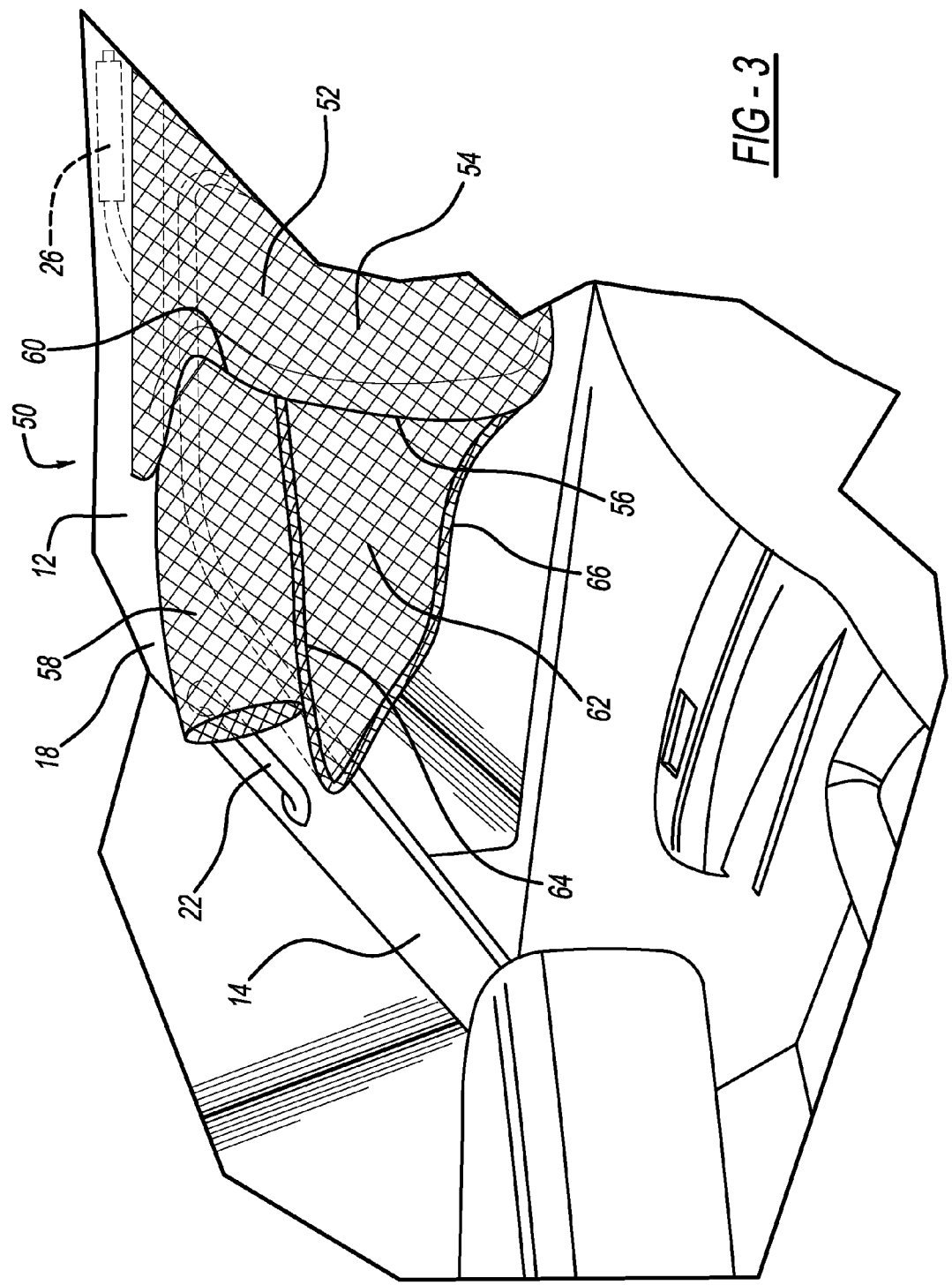
FIG. 3 illustrates the passenger side of a vehicle having a curtain airbag system according to the disclosed inventive concept viewed at an angle from the driver's side following deployment with a medium-length inflatable extension having been inflated.
Figure 4:
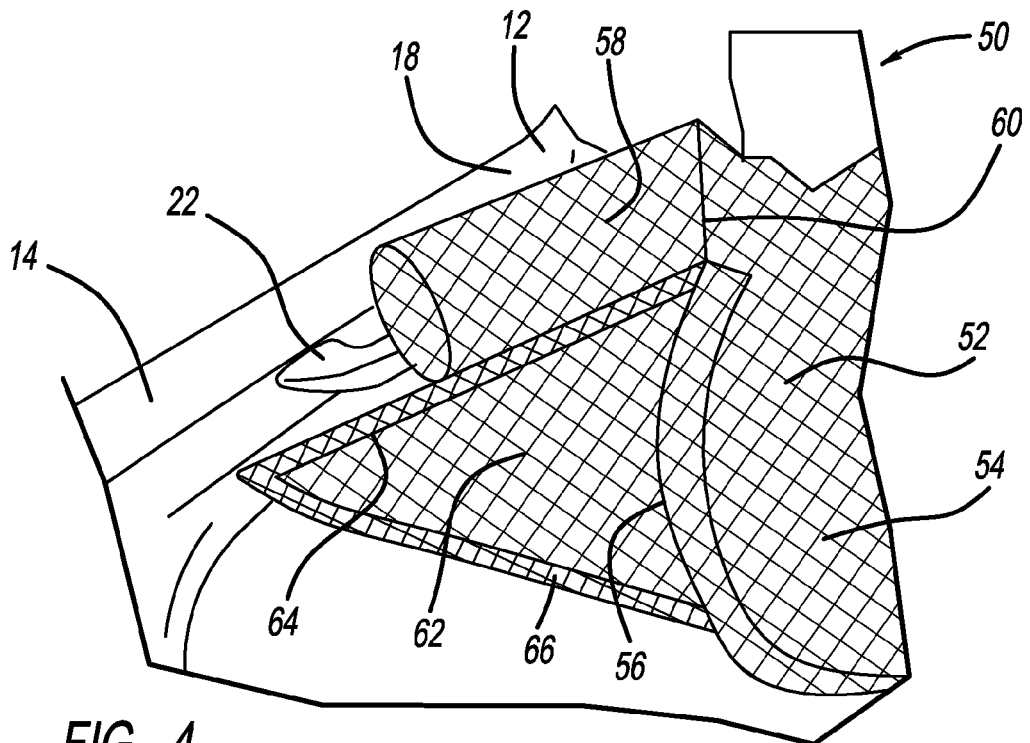
FIG. 4 illustrates a side view the vehicle curtain airbag shown in FIG. 3.

Referring to FIGS. 3 and 4, an inflatable curtain assembly according to an embodiment of the disclosed inventive concept is generally illustrated as 50. The inflatable curtain assembly 50 is shown in FIGS. 3 and 4 in its fully deployed condition. The inflatable curtain assembly 50 includes an inflatable curtain 52 having an inflatable cushion main body 54. The inflatable cushion main body 54 has a leading edge 56.

An elongated and inflatable medium-length extension 58 extends vehicle forward from the inflatable cushion main body 54. While the shape of the inflatable extension 58 is illustrated as being tubular it is to be understood that the shape of the inflatable extension 58 may be rectangular, triangular or virtually any other shape that may be appropriate for this component.

The elongated and inflatable medium-length extension 58 includes a trailing edge 60 that is also attached to the inflatable cushion main body 54 at the leading edge 56. Attachment of the elongated and inflatable extension 58 to the inflatable cushion main body 54 may be made in any known fashion including stitching or riveting provided that a fluid-passing channel is formed between the elongated and inflatable extension 58 and the inflatable cushion main body 54 to allow inflating gas to enter the elongated and inflatable extension 58 from the inflatable cushion main body 54 upon inflation by the inflator 26.

Figure 5:
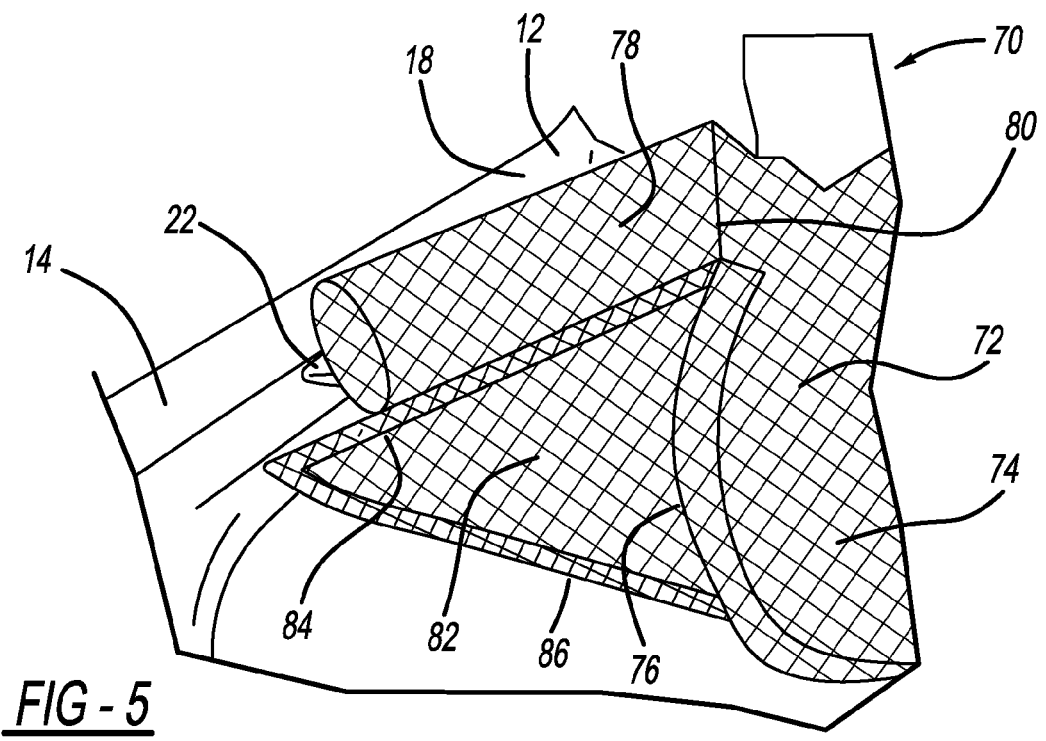
FIG. 5 is a view similar to FIG. 4 but illustrating an alternate embodiment of the disclosed inventive concept having a full-length inflatable extension.
Figure 6:
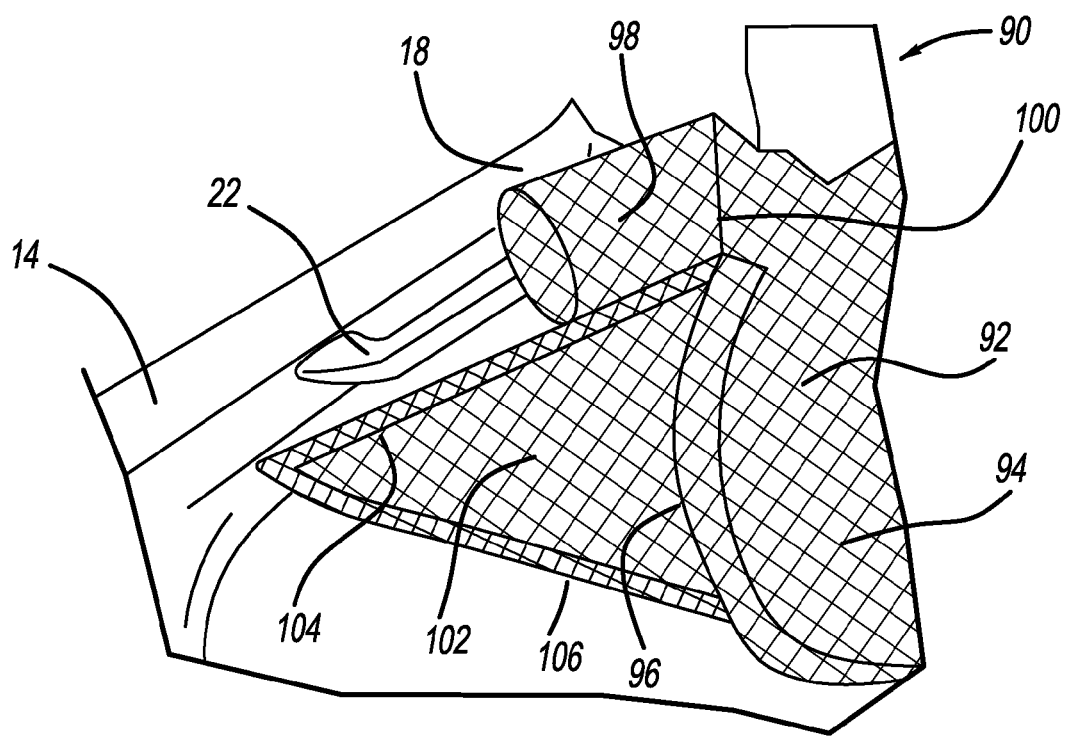
FIG. 6 is also a view similar to that of FIG. 4 but illustrating an additional embodiment of the disclosed inventive concept having a relatively short inflatable extension.

As illustrated in FIGS. 3 and 4, the elongated and inflatable medium-length extension 58 partially covers the grab handle 22 when the inflatable curtain assembly 50 is in its illustrated deployed condition. As discussed below and as illustrated in FIGS. 5 and 6, the length of the elongated and inflatable extension and thus its position over the grab handle 22 when deployed may be varied by design. Regardless of the length of the elongated and inflatable extension 58, the objective of minimizing or eliminating the risk of the occupant's head from impacting any of the roof rail 12, the A-pillar 18, or the grab handle 22 is achieved as the occupant's head is deflected from any of these components in an impact event.

An optional triangular-shaped extension or sail cloth 62 may be fitted to the inflatable curtain assembly 50. If so fitted, the triangular-shaped extension or sail cloth 62 may be inflatable or non-inflatable. When provided, the extension or sail cloth 62 extends vehicle forward from the inflatable cushion main body 54. The triangular-shaped extension or sail cloth 62 preferably includes an upper tether 64 that may or may not be attached to the lower edge of the elongated and inflatable extension 58 and a lower tether 66. The upper tether 64 and the lower tether 66 as well as the extension or sail cloth 62 are attached to the leading edge 56 of the inflatable cushion main body 54.

If the extension or sail cloth 62 is inflatable then the attachment to the inflatable cushion main body 54 is made in such a way that that a fluid-passing channel is formed between the inflatable cushion main body 54 and the triangular-shaped extension or sail cloth 62 to allow inflating gas to enter the triangular-shaped extension or sail cloth 62 from the inflatable cushion main body 54 upon inflation.

As noted above, the length of the elongated and inflatable medium-length extension can be other than that illustrated in FIGS. 3 and 4. Particularly, and with respect to FIG. 5, an inflatable curtain assembly according to an alternate embodiment of the disclosed inventive concept is generally illustrated as 70. The inflatable curtain assembly 70 is shown in its fully deployed condition. The inflatable curtain assembly 70 includes an inflatable curtain 72 having an inflatable cushion main body 74. The inflatable cushion main body 74 has a leading edge 76.

An elongated and inflatable full-length extension 78 extends vehicle forward from the inflatable cushion main body 74. While the shape of the inflatable extension 78 is illustrated as being tubular it is to be understood that the shape of the inflatable extension 78 may be rectangular, triangular or virtually any other shape that may be appropriate for this component.

The elongated and inflatable full-length extension 78 includes a trailing edge 80 that is also attached to the inflatable cushion main body 74 at the leading edge 76. Attachment of the elongated and inflatable extension 78 to the inflatable cushion main body 74 may be made in any known fashion including stitching or riveting provided that a fluid-passing channel is formed between the elongated and inflatable extension 78 and the inflatable cushion main body 74 to allow inflating gas to enter the elongated and inflatable extension 78 from the inflatable cushion main body 74 upon inflation by the inflator (not shown).

The elongated and inflatable full-length extension 78 almost entirely covers the grab handle 22 when the inflatable curtain assembly 70 is in its illustrated deployed condition. An optional triangular-shaped extension or sail cloth 82 may be fitted to the inflatable curtain assembly 70. If so fitted, the triangular-shaped extension or sail cloth 82 may be inflatable or non-inflatable. When provided, the extension or sail cloth 82 extends vehicle forward from the inflatable cushion main body 74. The triangular-shaped extension or sail cloth 82 preferably includes an upper tether 84 that may or may not be attached to the lower edge of the elongated and inflatable extension 78 and a lower tether 86. The upper tether 84 and the lower tether 86 as well as the extension or sail cloth 82 are attached to the leading edge 76 of the inflatable cushion main body 74.

The length of the elongated and inflatable extension can also be shorter than that illustrated in FIGS. 3, 4 and 5. Particularly, and with respect to FIG. 6, an inflatable curtain assembly according to an alternate embodiment of the disclosed inventive concept is generally illustrated as 90. The inflatable curtain assembly 90 is shown in its fully deployed condition. The inflatable curtain assembly 90 includes an inflatable curtain 92 having an inflatable cushion main body 94. The inflatable cushion main body 94 has a leading edge 96.

An elongated and inflatable shorter extension 98 extends vehicle forward from the inflatable cushion main body 94. While the shape of the inflatable shorter extension 98 is illustrated as being tubular it is to be understood that the shape of the inflatable shorter extension 98 may be rectangular, triangular or virtually any other shape that may be appropriate for this component.

The elongated and inflatable shorter extension 98 includes a trailing edge 100 that is also attached to the inflatable cushion main body 94 at the leading edge 96. Attachment of the elongated and inflatable shorter extension 98 to the inflatable cushion main body 94 may be made in any known fashion including stitching or riveting provided that a fluid-passing channel is formed between the elongated and inflatable shorter extension 98 and the inflatable cushion main body 94 to allow inflating gas to enter the elongated and inflatable shorter extension 98 from the inflatable cushion main body 94 upon inflation by the inflator (not shown).

As illustrated, the elongated and inflatable shorter extension 98 partially covers the grab handle 22 when the inflatable curtain assembly 90 is in its illustrated deployed condition. Optionally the elongated and inflatable shorter extension 98 may not cover the grab handle 22 at all.

An optional triangular-shaped extension or sail cloth 102 may be fitted to the inflatable curtain assembly 90. If so fitted, the triangular-shaped extension or sail 102 may be inflatable or non-inflatable. When provided, the extension or sail cloth 102 extends vehicle forward from the inflatable cushion main body 94. The triangular-shaped extension 102 preferably includes an upper tether 104 that may or may not be attached to the lower edge of the elongated and inflatable extension 98 and a lower tether 106. The upper tether 104 and the lower tether 106 as well as the extension or sail 102 are attached to the leading edge 96 of the inflatable cushion main body 94.

The disclosed inventive concept as set forth above overcomes the challenges faced by known curtain airbag arrangements for vehicles which offer limited protection to an occupant of a passenger seat during an impact event. The disclosed inventive concept either eliminates or significantly reduces the possibility of the head of the vehicle passenger seat occupant impacting the grab handle fitted to the vehicle's A-pillar.

Of course, while the arrangement of the disclosed inventive concept is shown in relation to the vehicle's A-pillar, it could easily be positioned as well relative to the pillars, including, for example, the vehicle's B-pillar. Thus the disclosed inventive concept has broad application to a variety of vehicle pillar arrangements.

In addition, the width of the elongated and inflatable extension may be varied. Furthermore, the disclosed inventive concepts may find application in vehicles having roof rail and pillar configurations other than that shown and described herein are possible and that the disclosed inventive concept may be adapted to such alternative configurations without deviating from the spirit or scope of the disclosed inventive concept.

Accordingly, one skilled in the art will readily recognize from such discussion, and from the accompanying drawings and claims that various changes, modifications and variations can be made therein without departing from the true spirit and fair scope of the invention as defined by the following claims.

What is claimed is:

1. A curtain airbag system for a vehicle having a passenger compartment and a roof pillar, the system comprising:
    an inflatable curtain having a forward portion;
    a sail cloth attached to said forward portion; and
    an elongated and inflatable extension to which said cloth is attached, said extension being extendable from said curtain that extends over at least part of the pillar when said extension is inflated, said extension extending from said forward portion.

2. The curtain airbag system of claim 1 wherein the pillar has a grab handle and wherein said elongated and inflatable extension extends over at least a portion of said grab handle when inflated.

3. The curtain airbag system of claim 1 wherein said sail cloth has a shape and said shape is generally triangular.

4. The curtain airbag system of claim 3 wherein a portion of said triangle extends over the pillar when said extension is inflated.

5. The curtain airbag system of claim 1 wherein said elongated and inflatable extension is tubular.

6. A safety system for a vehicle having a passenger compartment, the system comprising:
    a roof rail;
    a pillar connected to said rail;
    a curtain module substantially embedded in said rail, said module comprising an inflatable curtain and an elongated and inflatable first extension extendable from said curtain that extends over at least a portion of said pillar when said extension is inflated, said curtain including a forward portion and said extension extending therefrom; and
    a second extension extendable from said forward portion of said curtain when the curtain is inflated.

7. The safety system of claim 6 wherein said second extension has a shape and said shape is generally triangular.

8. The safety system of claim 6 wherein a portion of said second extension extends over said pillar when said second extension is inflated.

9. The safety system of claim 6 wherein a portion of said first extension is attached to said second extension.

10. The safety system of claim 6 wherein said elongated and inflatable extension is tubular.

11. The safety system of claim 6 further including an inflator attached to said inflatable curtain.

12. A method of protecting the occupant of a vehicle having a roof rail and a pillar attached to the rail, the method comprising the steps of:
    forming a curtain module substantially embedded in the rail when inactive, said module comprising an inflatable curtain and a elongated and inflatable first extension, said curtain including a forward portion from which said extension extends, said module further including a second extension extendable from said forward portion when said curtain is inflated; and
    extending said first extension from said curtain and over at least a portion of the pillar in an impact event.

13. The method of claim 12 wherein said first extension is tubular.

* * * * *